(12) United States Patent
Sonehara et al.

(10) Patent No.: US 8,064,135 B2
(45) Date of Patent: Nov. 22, 2011

(54) POLARIZATION ELEMENT

(75) Inventors: Toshiaki Sonehara, Shinjuku-ku (JP); Seiichi Yokoyama, Shinjuku-ku (JP); Michiyori Miura, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/875,774

(22) Filed: Sep. 3, 2010

(65) Prior Publication Data

US 2010/0328771 A1    Dec. 30, 2010

Related U.S. Application Data

(63) Continuation of application No. PCT/JP2009/054297, filed on Mar. 6, 2009.

(30) Foreign Application Priority Data

Mar. 7, 2008   (JP) ................................ 2008-057244

(51) Int. Cl.
    *G02B 5/30* (2006.01)
(52) U.S. Cl. ............................................... 359/485.05
(58) Field of Classification Search .................. None
    See application file for complete search history.

(56) References Cited

U.S. PATENT DOCUMENTS

| 5,151,956 A | * | 9/1992 | Bloemer ........................ 385/11 |
| 2006/0262398 A1 | * | 11/2006 | Sangu et al. ................. 359/486 |
| 2011/0002026 A1 | * | 1/2011 | Miura et al. ................. 359/241 |

FOREIGN PATENT DOCUMENTS

| JP | 5-208844 | 8/1993 |
| JP | 9-265009 | 10/1997 |
| JP | 11-183727 | 7/1999 |
| JP | 2007-272016 | 10/2007 |

OTHER PUBLICATIONS

Kazutaka Baba and Mitsunobu Miyagi, "Anisotropic optical media from laminated island films: theory," J. Opt. Soc. Am. A 8, 619-624 (1991).*
U.S. Appl. No. 12/882,267, filed Sep. 15, 2010, Miura, et al.

* cited by examiner

*Primary Examiner* — Lee Fineman
(74) *Attorney, Agent, or Firm* — Oblon, Spivak, McClelland, Maier & Neustadt, L.L.P.

(57) ABSTRACT

Provided is a polarizing element, which is made into an assembly of metal elements by utilizing the fact that the plasmon resonance wavelengths of metal elements are different for the polarization direction of a light to irradiate the metal elements. The sum of the geometrically sectional areas of the metal elements in a plane substantially normal to the propagation direction of the irradiating light is smaller than the area of the irradiated region of the light, and the sum of the absorbing sectional areas of the metal elements in the plasmon resonance wavelengths is five times or more as large as the area of the irradiated region.

10 Claims, 8 Drawing Sheets

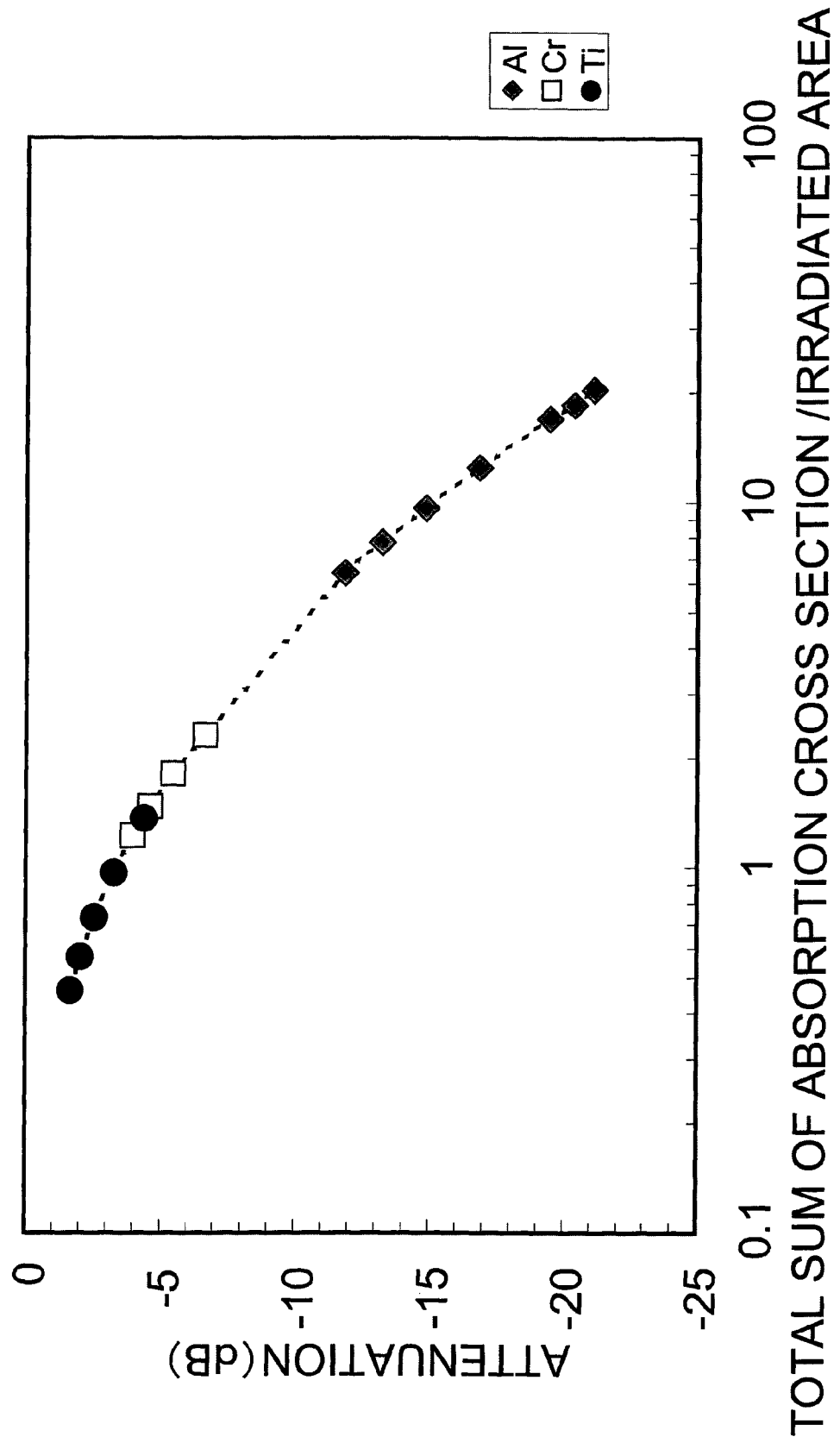
[FIG. 1]

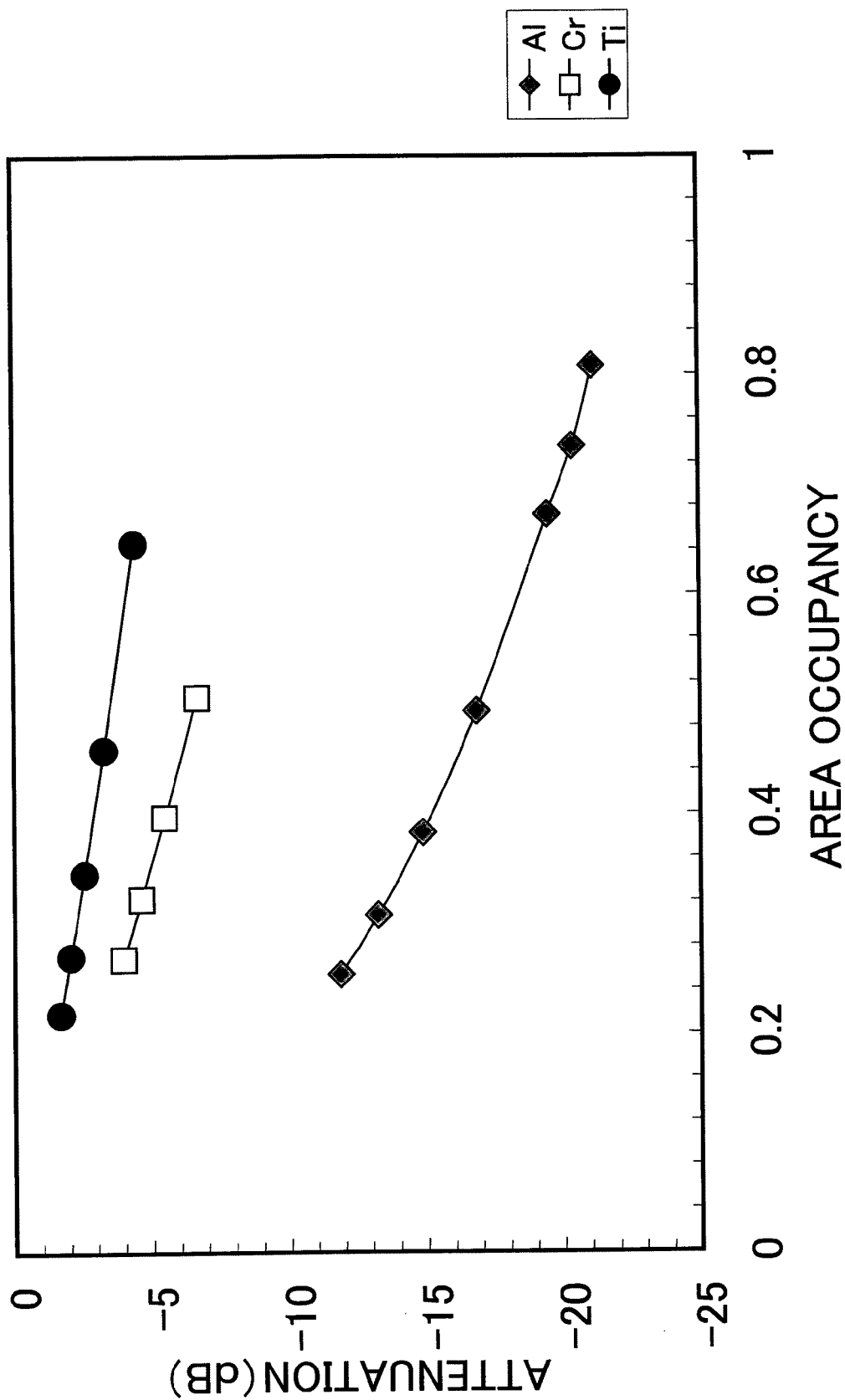
[FIG. 2]

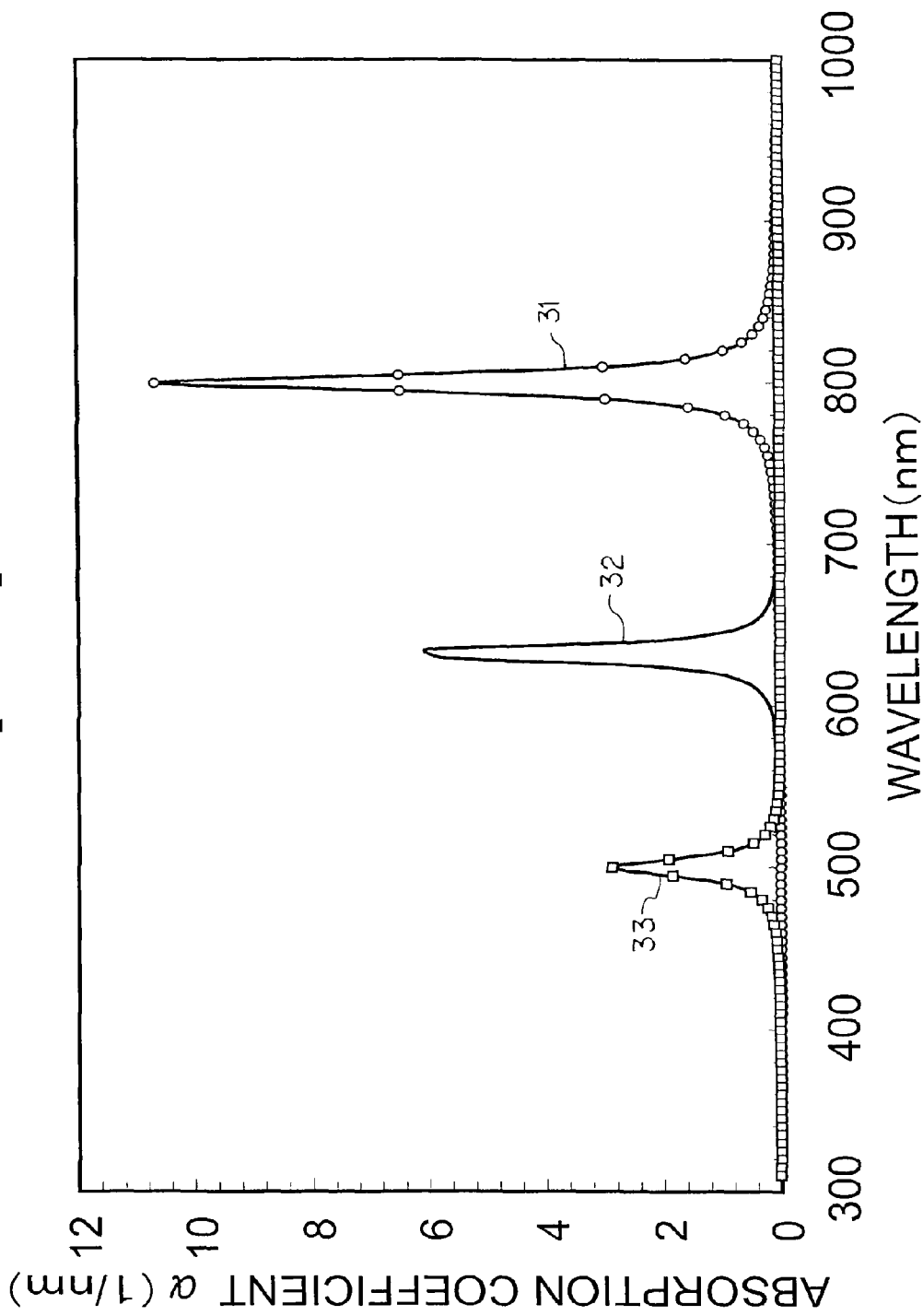

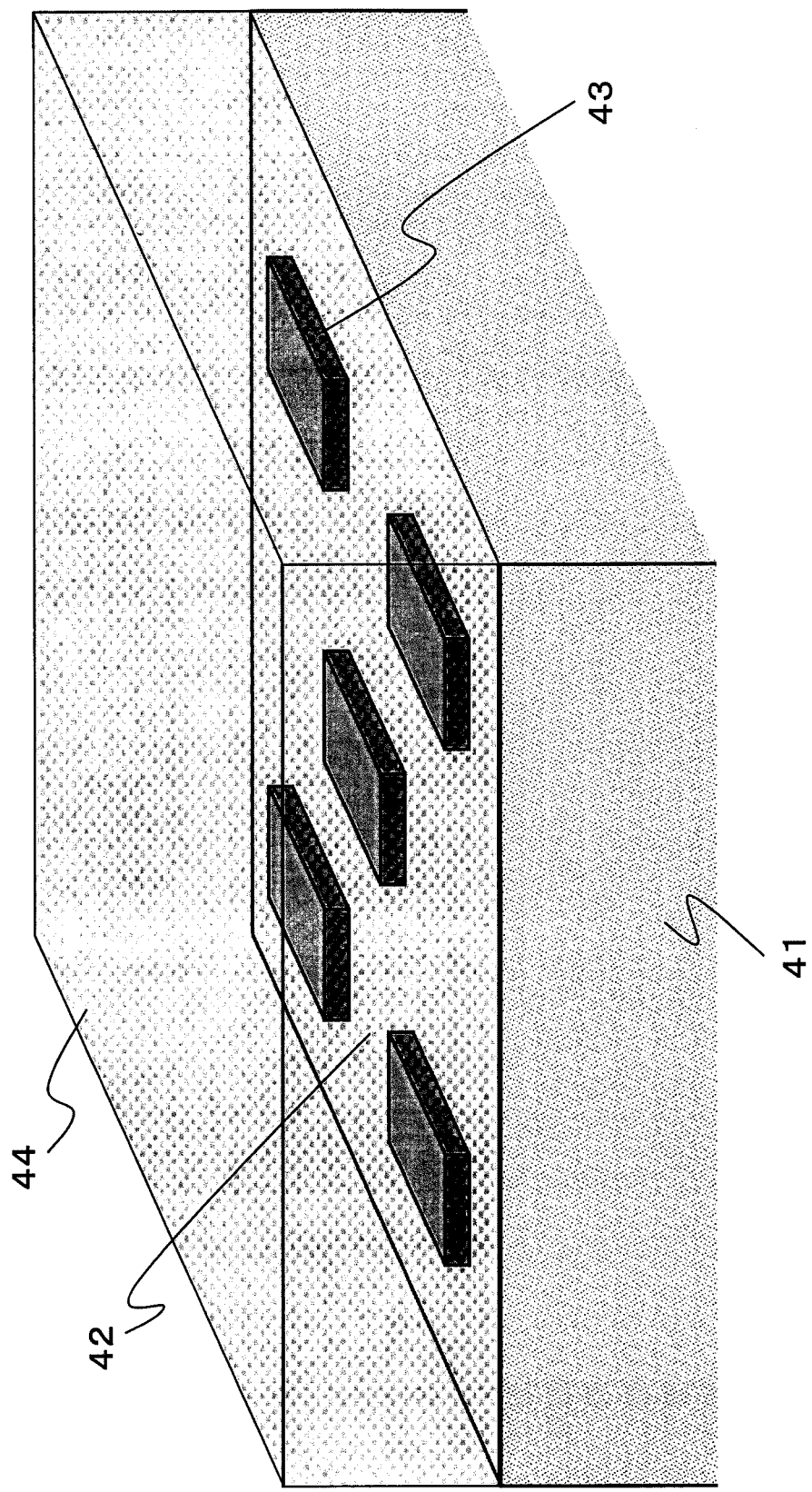
[FIG. 4]

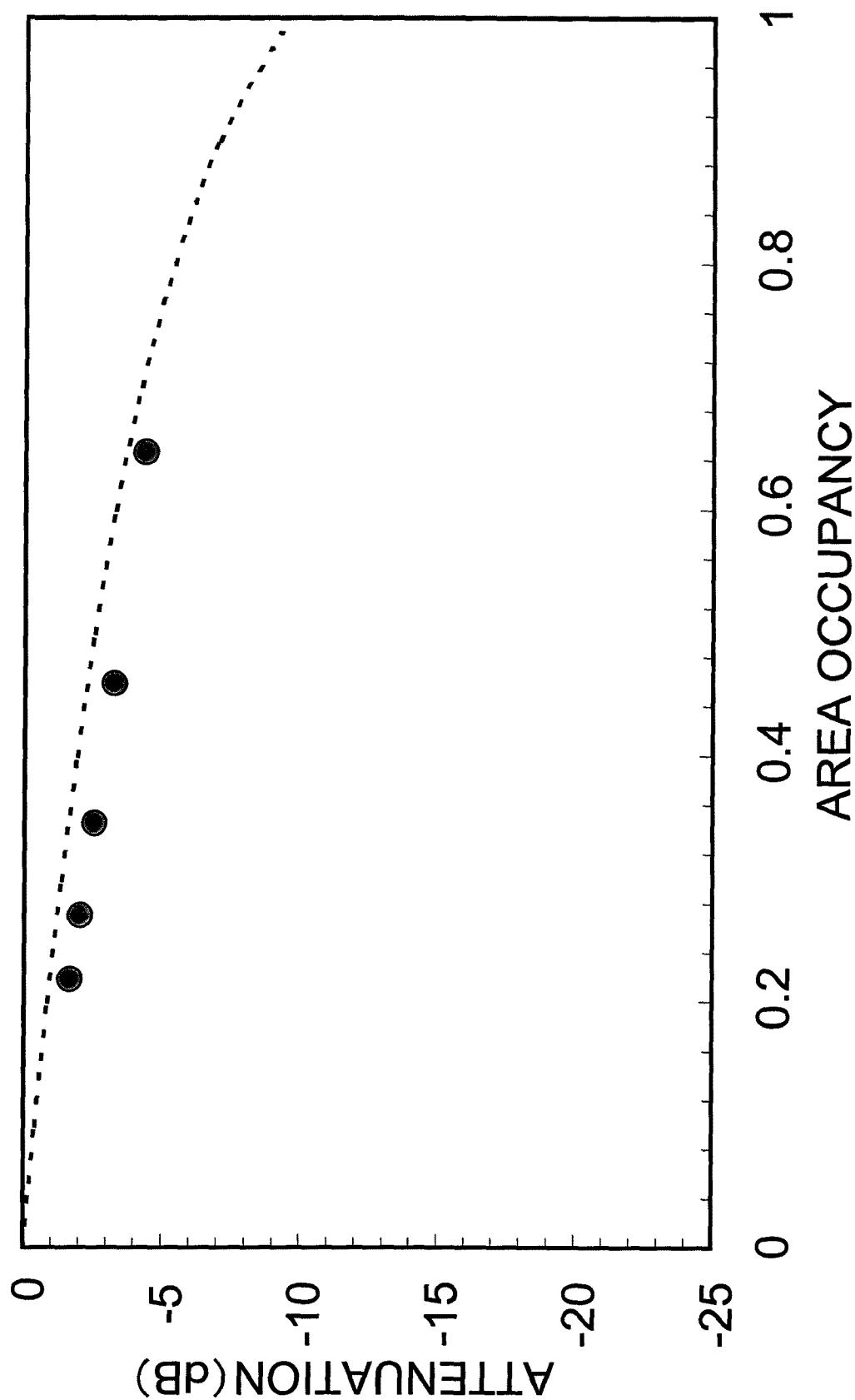

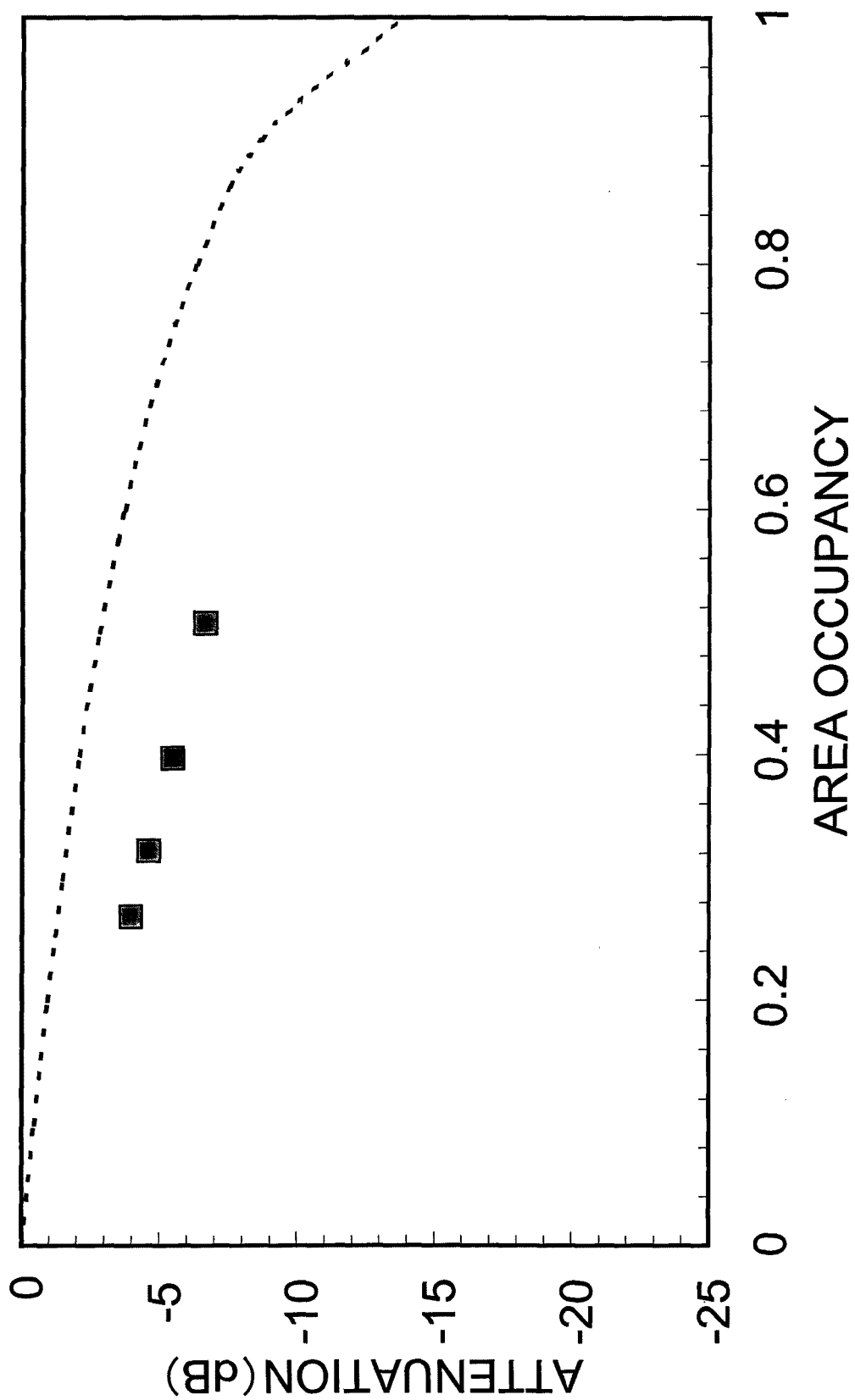
[FIG. 6]

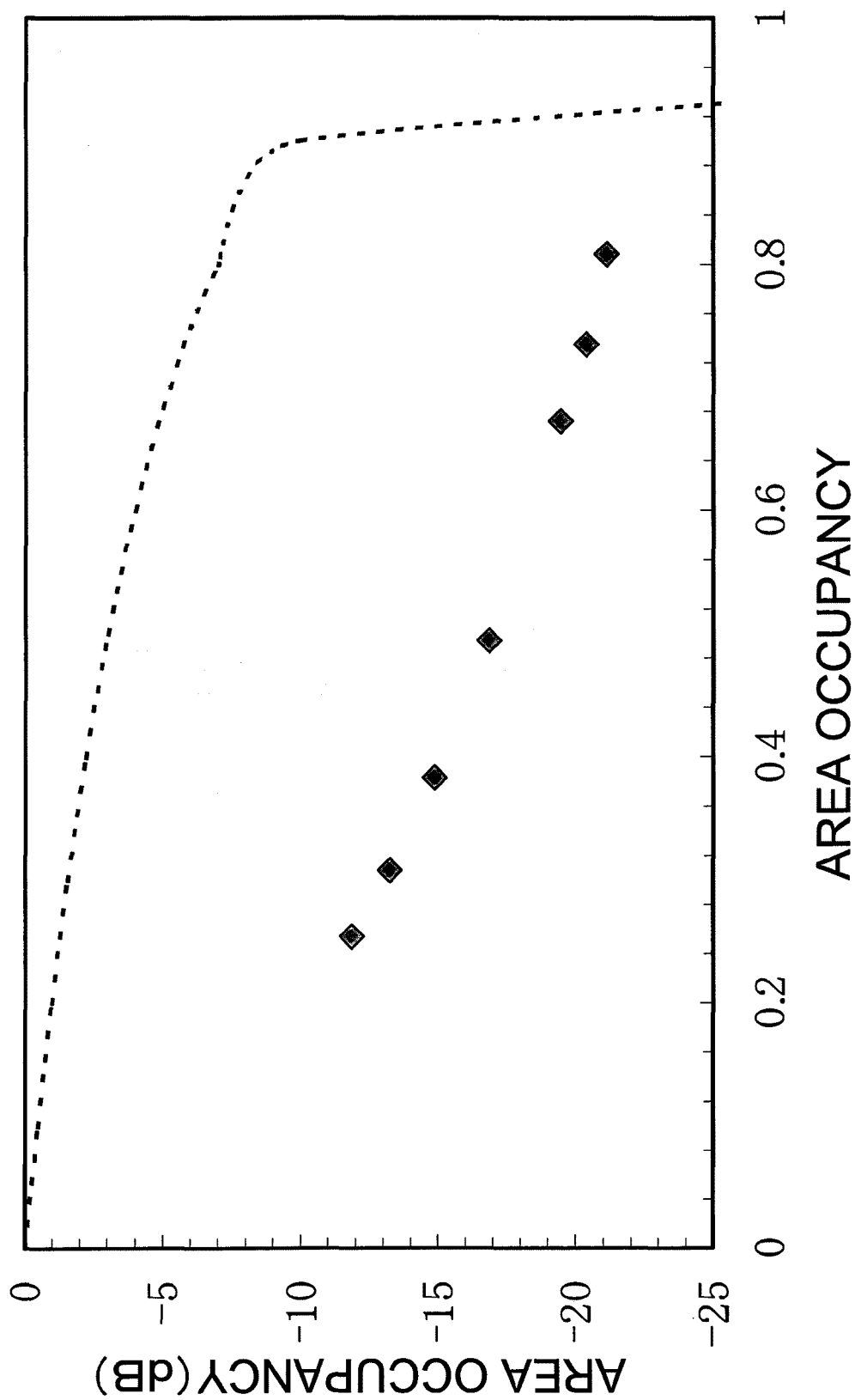
[FIG. 7]

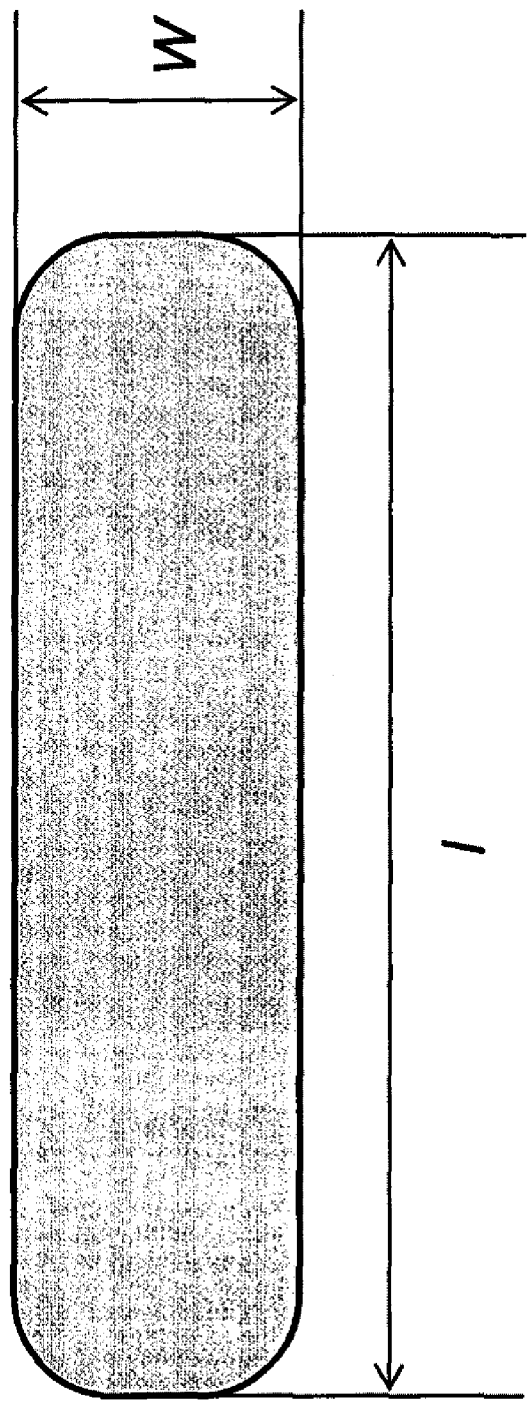
[FIG. 8]

US 8,064,135 B2

POLARIZATION ELEMENT

CROSS REFERENCES TO RELATED APPLICATIONS

This application is a continuation application of International Application No. PCT/JP2009/054297, filed Mar. 6, 2009, the entire contents of which is incorporated herein by reference. PCT/JP2009/054297 claims priority to JP 2008-057244, filed Mar. 7, 2008.

BACKGROUND OF THE INVENTION

1. Field of the Invention

The present invention relates to a polarization element, and particularly, to a polarization element using a difference in light absorption efficiency due to the shape anisotropy of metal fine particles.

2. Description of the Related Art

A polarization element means an optical element having a function of transmitting a linearly polarized wave having an electric field vibration plane in a specific direction and preventing the transmission of a linearly polarized wave having an electric field vibration plane in a direction perpendicular to the specific direction (hereinafter, in the polarization element, the electric field vibration direction of transmission light is referred to as a "transmission axis" and a direction perpendicular to the transmission axis is referred to as an "extinction axis").

The characteristics of the polarization element are evaluated using loss (hereinafter, the loss is referred to as an "insertion loss") when a linearly polarized wave having an electric field vibration plane in a direction parallel to the transmission axis of the element passes through the polarization element and a value (hereinafter, the value is referred to as an "extinction ratio") obtained by dividing the intensity of the electric field when a linearly polarized wave having an electric field vibration plane parallel to the extinction axis passes through the polarization element by the intensity of the electric field when a linearly polarized wave having an electric field vibration plane parallel to the transmission axis passes through the polarization element. The polarization element with good characteristics means an element with a small insertion loss and a high extinction ratio.

As the polarization element using metal fine particles, a polarizing glass has been known in which acicular metal fine particles made of silver or copper are dispersed in a glass substrate such that the longitudinal direction thereof is aligned with a specific direction (hereinafter, the polarization element is referred to as a "metal fine particle dispersed polarizing glass"). A method of manufacturing the metal fine particle dispersed polarizing glass is described in detail in, for example, JP-A-5-208844 and the main points thereof are as follows.

<1> A glass material including cuprous chloride is prepared to have a desired composition, is melted at a temperature of about 1450° C., and is then annealed to the room temperature. <2> Then, a thermal treatment is performed to precipitate cuprous chloride fine particles in the glass. <3> After the cuprous chloride fine particles are precipitated, a preform with an appropriate shape is produced by a machining process. <4> The preform is heated and elongated under predetermined conditions, thereby obtaining acicular particles of cuprous chloride. <5> The elongated cuprous chloride is reduced in a hydrogen atmosphere to obtain acicular metallic copper fine particles.

A metal fine particle dispersed polarizing glass in which acicular metallic copper fine particles with a minor axis of 20 to 75 nm, a major axis of 120 to 350 nm, and an aspect ratio (value obtained by dividing the major axis of the acicular particle by the minor axis thereof) of 2.5 to 10 are dispersed in a base glass is manufactured by the manufacturing method, which is disclosed in JP-A-5-208844.

Patent Citation 1: JP-A-5-208844

SUMMARY

The metal fine particle dispersed polarizing glass according to the related art has an insertion loss of 0.1 dB or less and an extinction ratio of 30 dB or more. Therefore, there are few practical problems with the function of the metal fine particle dispersed polarizing glass. However, as described above, since the metal fine particle dispersed polarizing glass is manufactured by complicated processes, such as precipitation, elongation, and reduction, the reproducibility of the shape of the particles is not necessarily good. As a result, in some cases, it is difficult to obtain a desired extinction ratio and there is a problem regarding the stable production of the metal fine particle dispersed polarizing glass.

The invention has been made in order to solve the above-mentioned problems and an object of the invention is to provide a polarization element with high shape controllability and high productivity.

Technical Solution

In order to achieve the object, according to a first aspect of the invention, a polarization element includes: a substrate that transmits light with a predetermined wavelength; and an aggregate of metal pieces each of which is arranged in an island shape on the substrate. Desired polarization characteristics are obtained by a variation in the plasmon resonance wavelength of the metal piece that depends on the polarization direction of light irradiated to the metal piece. The plasmon resonance wavelength of the metal piece in a predetermined direction is substantially equal to the wavelength of the light irradiated to the polarization element. The total sum of the geometric cross sections of the metal pieces in a plane which is substantially perpendicular to the propagation direction of the light irradiated to the polarization element in a light radiation region is smaller than the area of the light radiation region. The total sum of the absorption cross sections of the metal pieces at the plasmon resonance wavelength is equal to or more than 5 times the geometric area of the light radiation region.

According to a second aspect of the invention, in the polarization element according to the first aspect, the aggregate of the metal pieces may be covered with a dielectric that transmits light with a predetermined wavelength.

According to a third aspect of the invention, in the polarization element according to the first or second aspect, the metal piece may have a substantially rectangular parallelepiped shape, and the longest side of the substantially rectangular parallelepiped in the aggregate of the metal pieces may be aligned substantially in a constant direction.

According to a fourth aspect of the invention, in the polarization element according to the first or second aspect, the metal piece may have a substantially elliptical cylinder shape, and the major axis of the ellipse may be aligned substantially in a constant direction.

According to a fifth aspect of the invention, in the polarization element according to any one of the first to fourth aspects, the length of the metal piece in a direction parallel to the propagation direction of the irradiated light may be equal to or less than one-tenth of the wavelength of the irradiated light, and the dimensions of the metal piece in a plane perpendicular to the propagation direction of the irradiated light may be equal to or less than 1 µm.

According to a sixth aspect of the invention, in the polarization element according to any one of the first to fifth aspects, the metal piece may be made of Al or an Al alloy including Al as a main component.

ADVANTAGEOUS EFFECTS

The polarization element according to the invention can be manufactured by a process including a general nanoimprint lithography method as the main method. The polarization element has high productivity and high controllability and reproducibility of the shape and size of the metal fine particles, as compared to the metal fine particle dispersed polarizing glass according to the related art. As a result, according to the polarization element, it is possible to achieve stable production.

BRIEF DESCRIPTION OF THE DRAWINGS

FIG. 1 shows a variation in attenuation with respect to the ratio between the total sum of the absorption cross sections, Cabs, of various kinds of metal pieces in a region irradiated with light and the area of the radiation region.

FIG. 2 is a relationship between area occupancy and attenuation in various kinds of metal pieces.

FIG. 3 is a depolarization factor dependence of the absorption spectrum.

FIG. 4 is a perspective view illustrating an example of the structure of a rectangular fine particle arranged polarization element according to the invention.

FIG. 5 is a relationship between the area occupancy and the attenuation of transmitted light when a metal piece is Ti.

FIG. 6 is a relationship between the area occupancy and the attenuation of transmitted light when a metal piece is Cr.

FIG. 7 is a relationship between the area occupancy and the attenuation of transmitted light when a metal piece is Al.

FIG. 8 is a diagram schematically illustrating the meaning of a substantially rectangular parallelepiped shape.

DETAILED DESCRIPTION OF THE EMBODIMENTS

In metal fine particles with a diameter sufficiently smaller than the wavelength of light, for example, a diameter of about several tens of nanometers, the movement of free electrons is limited by the boundary determined by the shape of the fine particles. Therefore, it is possible to treat the metal fine particles as a dielectric material that is uniformly polarized. In this case, a depolarization field is formed in the fine particles depending on the shape of the fine particles and affects a response to the electric field applied from the outside (hereinafter, referred to as an "external electric field"). In particular, when a response to the external electric field is delayed, energy loss occurs and light is resonantly absorbed at a specific frequency. The response to the external electric field is referred to as a so-called dielectric response function, $\in(\omega)$, and is represented by the following Expression (1):

$$\varepsilon(\omega) = 1 + \frac{\varepsilon*(\omega)/\varepsilon_a - 1}{1 + [\varepsilon*(\omega)/\varepsilon_a - 1]L}. \quad \text{[Expression 1]}$$

In Expression (1), $\omega$ indicates the angular frequency of irradiated light, $\in(\omega)$ indicates the dielectric response function of metal forming fine particles at $\omega$. (complex permittivity at $\omega$), $\in_a$ indicates the permittivity of a medium in the vicinity of the metal fine particles, and L indicates a depolarization factor determined by the shape of the fine particles.

The depolarization factor does not depend on the material forming the fine particles, but is determined by only the shape of the fine particles. The depolarization factor is only analytically calculated when the fine particle has a spheroidal shape including a sphere. For example, when the fine particle has a spherical shape, the depolarization factor is ⅓. When the fine particle has a cigar-shaped spheroidal shape (prolate spheroid shape) with an aspect ratio of about 3, the value of the depolarization factor in the major axis direction is 0.108.

A light absorption coefficient, $\alpha$, according to the single fine particle is represented by the following Expression (2).

$$\alpha = \frac{2\pi \cdot n_a^3}{L^2 \cdot \lambda} \cdot \frac{\varepsilon''}{\left[\varepsilon' + \varepsilon_a \cdot \left(\frac{1}{L} - 1\right)\right]^2 + \varepsilon''^2}. \quad \text{[Expression 2]}$$

In Expression (2), $n_a$ indicates the refractive index of a medium in the vicinity of the metal fine particles, $\lambda$ indicates the vacuum wavelength of irradiated light, and $\in'$ and $\in''$ indicate a real part and an imaginary part of complex permittivity ($\in*(\omega)$) at the angular frequency $\omega$ (wavelength: $\lambda$).

FIG. 3 shows the influence of the depolarization factor on the spectrum of the absorption coefficient calculated by Expression (2) in the case of a metallic silver fine particle. In FIG. 3, reference numeral 31 indicates a spectrum when the depolarization factor of the metallic silver fine particle in the major axis direction is 0.065, reference numeral 32 indicates a spectrum when the depolarization factor is 0.108, and reference numeral 33 indicates a spectrum when the depolarization factor is 0.1867. During calculation, the refractive index of a medium in the vicinity of the silver fine particle was 1.45 (permittivity: 2.1025) and irradiated light was a linearly polarized wave having an electric field vibration plane in a direction parallel to the major axis direction of a spheroid. As shown in FIG. 3, in all of the depolarization factors, the absorption coefficient has the maximum value at a specific wavelength. The maximum value is obtained since the vibration of a free electron in the metallic silver fine particle resonates with the vibration of the applied electric field (corresponding to the vibration of an electric field component of the irradiated light), which is generally known as a plasmon resonance phenomenon (hereinafter, the wavelength of light where plasmon resonance occurs is referred to as a "plasmon resonance wavelength"). The plasmon resonance wavelength varies depending on the depolarization factor of the irradiated metal fine particle, more accurately, the depolarization factor in a direction parallel to the electric field vibration direction of irradiated light. When the depolarization factor is reduced, the plasmon resonance wavelength is shifted to a long wavelength side.

In the case of acicular particles, similar to the particles with the cigar-shaped spheroidal shape (prolate spheroid shape), the depolarization factor in the major axis direction is smaller than that in the minor axis direction and the plasmon resonance wavelengths are different in the two directions. In the metal fine particle dispersed polarizing glass according to the related art, the depolarization factor, that is, the aspect ratio of the acicular fine particle is determined such that the plasmon resonance wavelength of the acicular metal fine particle in the longitudinal direction is substantially equal to the desired wavelength of light. In this case, when a linearly polarized wave with a desired wavelength is irradiated to the acicular metal fine particle and the electric field vibration plane of the wave is aligned with the major axis direction of the acicular metal fine particle, the intensity of transmission light is greatly attenuated due to resonance absorption by the metal fine particle. In contrast, when the electric field vibration plane is aligned with the minor axis direction of the acicular metal fine particle, the resonance absorption by the metal fine particles does not occur. As a result, light passes through the acicular metal fine particle as the intensity thereof is hardly attenuated.

A mechanism for obtaining the polarization effect in the metal fine particle dispersed polarizing glass has been described above. For this reason, the polarizing glass is called an "absorption-type polarization element".

As described above, the depolarization factor is determined by the shape of the fine particle. Generally, a depolarization factor can be defined corresponding to a shape and a direction in the same way as a spheroid. However, the depolarization factor can be represented by an analytic expression only when the fine particle has a well-defined spheroidal shape including a sphere. That is, it is possible to calculate the depolarization factor of a metal fine particle with a general shape numerically. In other words, even though a fine particle has a rectangular parallelepiped shape, it is possible to obtain a depolarization factor of 0.065 by appropriately selecting the dimensional ratio of the length, width, and height of the fine particle.

As described above, the magnitude of the absorption coefficient, $\alpha$, shown in FIG. 3 is proportional to the extinction ratio of an "absorption-type polarizer". For example, when a fine particle having a rectangular parallelepiped shape with a thickness of 20 nm is assumed (here, the "thickness" means the length of the fine particle in a direction in which an irradiated linearly polarized plane wave is propagated) and the absorption coefficient, $\alpha$, is about 3 (dimension of 1/length), the intensity of light passing through the rectangular parallelepiped fine particle is exp(−60) and an extinction ratio of about −260 dB is obtained. The extinction ratio is significantly more than a required specification value, regardless of the field of application of the polarization element.

The inventors focused attention on the above points and thoroughly examined the polarization characteristics of a polarization element in which a plurality of metal fine particles with a rectangular parallelepiped shape was arranged in an island shape on an optically transparent substrate on the basis of the above-mentioned idea. The invention was achieved on the basis of the examination result (hereinafter, the polarizer having the above-mentioned structure is referred to as a "rectangular fine particle arranged polarization element").

Hereinafter, the rectangular fine particle arranged polarization element according to the invention will be described in detail.

FIG. 4 is a perspective view illustrating an example of the structure of the rectangular fine particle arranged polarization element according to the invention. In FIG. 4, reference numeral 41 indicates an optically transparent substrate, reference numeral 42 indicates a surface of the substrate 41, reference numeral 43 indicates a metal piece with a rectangular parallelepiped shape, and 44 indicates an optically transparent dielectric film. As shown in FIG. 4, in the rectangular fine particle arranged polarization element according to the invention, a plurality of metal pieces 43 with a rectangular parallelepiped shape having a size of several tens of nanometers to several hundreds of nanometers is arranged in an island shape on the surface 42 of the substrate 41, which is a glass substrate transmitting light with a desired wavelength, such as a quartz glass substrate, or a substrate made of a single crystal, such as sapphire, and the metal pieces are covered with a dielectric film that is made of, for example, $SiO_2$ and transmits light with a desired wavelength.

Next, the polarization effect of the rectangular fine particle arranged polarization element will be described.

As described above, the plasmon resonance wavelength of the metal piece 43 is determined by the permittivity and the depolarization factor of the material forming the metal piece. For example, it is assumed that the depolarization factor of the metal piece 43 in the long side direction is set such that the plasmon resonance occurs with respect to the wavelength of irradiated light and the depolarization factor of the metal piece 43 in the short side direction is set so as to deviate from the depolarization factor of the metal piece 43 in the long side direction. This will be described in detail in examples. This relationship between the depolarization factors is established by appropriately setting the dimensional ratio of the sides of the rectangular parallelepiped.

In the above-mentioned structure, when a linearly polarized wave is irradiated in a direction that is substantially parallel to the normal direction of the surface 42 of the substrate and the electric field vibration plane of the linearly polarized wave is parallel to the long side direction of the rectangular-parallelepiped-shaped metal piece 43, the energy of the irradiated light is absorbed by the plasmon resonance occurring in the rectangular-parallelepiped-shaped metal piece 43 and the intensity of transmission light is greatly attenuated. In contrast, when the electric field vibration plane of the irradiated linearly polarized wave is parallel to the short side direction of the rectangular-parallelepiped-shaped metal piece 43, there is no energy loss due to the plasmon resonance.

The operating principle of the rectangular fine particle arranged polarization element has been described above.

The inventors examined the influence of a metal species and the area occupancy of the metal piece 43 in the surface 42 of the substrate on the extinction ratio on the basis of the above-mentioned idea. As a result of the examination, the following peculiar phenomenon was found and the invention was achieved.

FIG. 5 shows the relationship between the area occupancy and attenuation when the metal species is Ti. The Ti piece has a substantially rectangular parallelepiped shape and the dimensions of the long side, the short side, and the height (a thickness from the substrate surface, which is the same with the following description) are 95 nm, 25 nm, and 20 nm, respectively. The substrate is made of quartz glass and the dielectric film is made of $SiO_2$.

Next, the term "substantially rectangular parallelepiped shape" in the specification will be described. FIG. 8 is a diagram schematically illustrating the planar shape of a metal piece (the shape of the metal piece in the plane substantially perpendicular to the propagation direction of irradiated light). That is, the term "substantially rectangular parallelepiped shape" means a rectangular parallelepiped shape with round corners. The long side and the short side mean l and w in FIG. 8.

In this structure, the plasmon resonance wavelength of the Ti piece in the long side direction is in the range of 630 nm to 650 nm. The area occupancy was changed by varying the spacing between the adjacent Ti pieces with the same shape. The term "attenuation" means the ratio (unit: dB) between the intensity of transmission light and the intensity of irradiated light when a linearly polarized wave having an electric field vibration plane in a direction parallel to the long side direction of the Ti piece is irradiated.

In FIG. 5, a symbol ● indicates attenuation that is actually obtained, a dashed line indicates the relationship between the attenuation and the area occupancy, and the attenuation, Igeo, is calculated by the following expression (3). It is assumed that the attenuation is simply proportional to the area occupancy.

$$I_{geo} = 10 \cdot \log\left[\frac{I_t \cdot s + I_0 \cdot (1-s)}{I_0}\right]$$ [Expression 3]

In Expression (3), $I_0$ indicates the intensity of irradiated light, $I_t$ indicates the intensity of light passing through the Ti piece, and s indicates the area occupancy of the piece.

As shown in FIG. 5, in the case of the Ti piece, as the area occupancy increases, the attenuation increases. The value of the attenuation is substantially equal to the attenuation, Igeo, which is simply calculated from the area occupancy. When the electric field vibration plane of the irradiated light is parallel to the short side direction of the Ti piece, the attenuation thereof does not depend on the area occupancy, but is about 1 dB.

FIG. 6 shows the relationship between the area occupancy and the attenuation, which is the same as that shown in FIG. 5, when the metal species is Cr. The Cr piece has a rectangular parallelepiped shape and the dimensions of the long side, the short side, and the height of the piece are 250 nm, 26 nm, and 20 nm, respectively. Similar to the Ti piece, the substrate and the dielectric film are made of quartz glass and $SiO_2$, respectively. In this structure, the plasmon resonance wavelength of the Cr piece in the long side direction is in the range of 630 nm to 650 nm. The area occupancy was changed by varying the spacing between the adjacent Cr pieces with the same shape.

In FIG. 6, a symbol ■ indicates the actually obtained attenuation and a dashed line indicates the relationship between the attenuation and the area occupancy. It is assumed that the attenuation is simply proportional to the area occupancy and is calculated in the same way as that in FIG. 5. In the case of the Cr piece, as a result of calculation, the attenuation in the same area occupancy is more than that in the Ti piece and there is a large difference between the attenuation and the attenuation represented by the dashed line. When the electric field vibration plane of the irradiated light is parallel to the short side direction of the Cr piece, the attenuation thereof does not depend on the area occupancy, but is about 1 dB.

FIG. 7 shows the relationship between the area occupancy and the attenuation, which is the same as those shown in FIGS. 5 and 6, when the metal species is Al. The Al piece has a rectangular parallelepiped shape and the dimensions of the long side, the short side, and the height of the piece are 180 nm, 25 nm, and 20 nm, respectively. Similar to the Ti and Cr pieces, the substrate and the dielectric film are made of quartz glass and $SiO_2$, respectively. In this structure, the plasmon resonance wavelength of the Al piece in the long side direction is in the range of 630 nm to 650 nm. The area occupancy was changed by varying the spacing between the adjacent Al pieces with the same shape.

In FIG. 7, a symbol ♦ indicates the actually obtained attenuation and a dashed line indicates the relationship between the attenuation and the area occupancy. It is assumed that the attenuation is simply proportional to the area occupancy and is calculated in the same way as that in FIGS. 5 and 6. In the case of the Al piece, the attenuation in the same area occupancy is more than that in the Ti and Cr pieces and there is a large difference between the attenuation and the attenuation represented by the dashed line. When the electric field vibration plane of the irradiated light is parallel to the short side direction of the Al piece, the attenuation thereof does not depend on the area occupancy, but is in the range of about 0.5 dB to 0.7 dB.

In the result shown in FIGS. 5 to 7, there is a peculiar phenomenon in that, in all of the metal species, the attenuation that is actually obtained is more than that simply calculated from the area occupancy on one level or another. The result shows that, although the rationale is unclear, a portion of the light irradiated to a region in which there is no metal piece as well as the light irradiated to the metal piece 43 is "absorbed" by the metal piece 43 and the intensity of the light is attenuated in FIG. 4. FIG. 2 shows the relationship between the area occupancy and the attenuation for each of the metal pieces shown in FIGS. 5 to 7. In the same area occupancy, the attenuation in Al is the largest, followed by Cr and Ti and the difference between the attenuation that is actually obtained and the attenuation simply calculated from the area ratio increases in this order.

That is, the inventors' examination proved that the attenuation (corresponding to the extinction ratio) in the rectangular fine particle arranged polarization element largely depended on the "absorption efficiency" as well as the absorption characteristics of the metal piece.

The inventors focused their attention on the concept of the "absorption cross section" in the plasmon resonance and found that, by introducing this concept, the relationship between the area occupancy and the attenuation considering the "absorption efficiency" of the metal piece could be obtained. The absorption cross section, Cabs, in the plasmon resonance is represented by the following Expression (4).

$$Cabs = \frac{2\pi \cdot n_a^3 \cdot V}{L^2 \cdot \lambda} \cdot \frac{\varepsilon''}{\left[\varepsilon' + \varepsilon_a \cdot \left(\frac{1}{L} - 1\right)\right]^2 + \varepsilon''^2}$$ [Expression 4]

In Expression (4), V indicates the volume of the metal piece and the other parameters are the same as those in Expression (3). As can be seen from the comparison between Expression (4) and Expression (3), the absorption cross section is the product of the absorption coefficient, α, and the volume, V, of the metal piece.

FIG. 1 shows a variation in the attenuation with respect to the ratio of the total sum of the absorption cross section, Cabs, obtained from Expression (4) to the area of a light radiation region, in each light radiation region for each metal piece. The meaning of the ratio of the total sum of the absorption cross section, Cabs, to the area of the radiation region is not necessarily limited to the light radiation region. For example, when the metal piece is arranged as a radiation portion in a region that is sufficiently wider than the light radiation region, the ratio means the ratio of the total sum of the absorption cross section to the area of the region.

As can be seen from FIG. 1, the actually obtained attenuation is distributed substantially on a single curve. As described above, if it is considered that the attenuation when the electric field vibration plane of the irradiated linearly polarized wave is parallel to the short side of the metal piece does not depend on the area occupancy of the metal piece, but is almost 1 dB, the attenuation shown in FIG. 1 substantially corresponds to the extinction ratio.

The extinction ratio required for the polarization element varies depending on the purpose. For example, the minimum value of the extinction ratio is about 10 dB. As can be seen from FIG. 1, the extinction ratio is achieved when the ratio between the total sum of the absorption cross section and the area of the radiation region is equal to or more than 5.

However, in the rectangular fine particle arranged polarization element, it is necessary to effectively generate the plasmon resonance in each metal piece in order to obtain polarization characteristics. In order to generate the plasmon resonance, it is necessary to apply a uniform electric field to each metal piece using irradiated light. In order to meet the requirements, it is preferable that the height of the metal piece be equal to or less than one-tenth of the wavelength of the irradiated light. When the surface of the substrate having the metal pieces arranged thereon is completely perpendicular to the propagation direction of the irradiated light, a uniform electric field is applied to the surface. Therefore, the dimensions of the metal piece are not restricted as long as the ratio between the long side and the short side of the metal piece is determined such that the wavelength of the irradiated light is equal to the plasmon resonance wavelength of the metal piece. However, it is difficult to make the surface completely perpendicular to the propagation direction of the irradiated light in practice. Therefore, it is preferable that the long and short sides of the metal piece be equal to or less than 1 μm.

The invention will be described in detail using examples.

EXAMPLE 1

An Al film was formed with a thickness of 20 nm on a quartz glass substrate with a size of 1 inch by 1 inch by a vapor deposition method. Then, each metal piece made of an Al film having a long side of 180 nm and a short side of 25 nm was formed in a region with a size of about 5 mm×5 mm by nanoimprint lithography and an ion etching method. Then, a $SiO_2$ film with a thickness of about 400 nm was formed so as to cover the metal pieces.

In Example 1, the spacing between the metal pieces was changed to manufacture rectangular fine particle arranged polarization elements having different geometric area occupancies as shown in Table 1.

The transmission characteristics of the polarization element manufactured by the above-mentioned method were measured with a spectrometer. As a result of the measurement, the plasmon resonance wavelength of the metal piece in the long side direction was in the range of 630 nm to 650 nm, without depending on the geometric area occupancy. The insertion loss and the extinction ratio of each polarization element were measured using a semiconductor laser with a wavelength of 630 nm and a beam diameter of about 1 mm. The insertion loss was in the range of 0.5 dB to 0.7 dB, without depending on the geometric area occupancy. Table 1 shows the measured extinction ratio and the ratio of the total sum of the absorption cross section of the metal pieces in the region (5 mm×5 mm) in which the metal piece group is formed to the area of the region, that is, (the total sum of the absorption cross section)/(the area of the radiation region). The absorption cross section of the metal piece was calculated using Expression 4.

TABLE 1

| Geometric area occupancy (%) | Extinction ratio (dB) | (Total sum of absorption cross section)/(area of radiation region) |
| --- | --- | --- |
| 25 | −11 | 6.4 |
| 31 | −12.5 | 7.7 |
| 38 | −14 | 9.6 |
| 49 | −16 | 12.4 |
| 67 | −18.5 | 17.0 |
| 73 | −19.5 | 18.5 |
| 80 | −20.5 | 20.4 |

EXAMPLE 2

A method of manufacturing a rectangular fine particle arranged polarization element according to this example was basically the same as that in Example 1 except that an Al film was formed with a thickness of 15 nm by the vapor deposition method and a substantially rectangular parallelepiped shape had a long side of 140 nm and a short side of 26 nm.

The transmission characteristics of the polarization element manufactured by the above-mentioned method were measured with a spectrometer. As a result of the measurement, the plasmon resonance wavelength of the metal piece in the long side direction was in the range of 620 nm to 650 nm, without depending on the geometric area occupancy. The insertion loss and the extinction ratio of each polarization element were measured by the same method as that in Example 1. The insertion loss was in the range of 0.5 dB to 0.7 dB, without depending on the geometric area occupancy.

Table 2 shows the measured extinction ratio and the ratio of the total sum of the absorption cross section of the metal pieces in the region (5 mm×5 mm) in which the metal piece group is formed to the area of the region, that is, (the total sum of the absorption cross section)/(the area of the radiation region), similar to Example 1. The absorption cross section of the metal piece was calculated using Expression 4.

TABLE 2

| Geometric area occupancy (%) | Extinction ratio (dB) | (Total sum of absorption cross section)/(area of radiation region) |
| --- | --- | --- |
| 31 | −11.5 | 5.8 |
| 38 | −12.5 | 7.2 |
| 49 | −14 | 12.4 |
| 67 | −17 | 9.3 |
| 73 | −18 | 13.9 |
| 80 | −19 | 15.3 |

The structure in which the metal piece is made of Al and has a substantially rectangular parallelepiped shape has been described in detail above using the examples. As described above, the effects of the invention may be obtained from the shapes of other metal pieces, for example, an elliptical cylinder shape or an oval shape as long as the requirements that the plasmon resonance wavelength of the metal piece in a specific direction is substantially equal to the wavelength of the irradiated light are satisfied.

INDUSTRIAL APPLICABILITY

The polarization element according to the invention can be widely applied to optical apparatuses including liquid crystal projectors.

Description of Reference Numerals and Signs

31: SPECTRUM OF ABSORPTION COEFFICIENT WHEN DEPOLARIZATION FACTOR IS 0.065
32: SPECTRUM OF ABSORPTION COEFFICIENT WHEN DEPOLARIZATION FACTOR IS 0.108
33: SPECTRUM OF ABSORPTION COEFFICIENT WHEN DEPOLARIZATION FACTOR IS 0.1867
41: OPTICALLY TRANSPARENT SUBSTRATE
42: SURFACE OF SUBSTRATE 41
43: METAL PIECE WITH RECTANGULAR PARALLELEPIPED SHAPE
44: OPTICALLY TRANSPARENT DIELECTRIC FILM

The invention claimed is:

1. A polarization element comprising:
a substrate that transmits light with a predetermined wavelength; and
an aggregate of metal pieces each of which is arranged in an island shape on the substrate,
wherein desired polarization characteristics are obtained by a variation in the plasmon resonance wavelength of the metal pieces that depends on the polarization direction of light irradiated to the metal pieces,
the plasmon resonance wavelength of the metal pieces in a predetermined direction is substantially equal to the wavelength of the light irradiated to the polarization element,
the total sum of the geometric cross sections of the metal pieces in a plane which is substantially perpendicular to the propagation direction of the light irradiated to the polarization element in a light radiation region is smaller than the area of the light radiation region, and
the total sum of the absorption cross sections of the metal pieces at the plasmon resonance wavelength is equal to or more than 5 times the geometric area of the radiation region.

2. The polarization element according to claim 1, wherein the aggregate of the metal pieces is covered with a dielectric that transmits light with a predetermined wavelength.

3. The polarization element according to claim 1, wherein the metal pieces have a substantially rectangular parallelepiped shape, and
the longest side of the substantially rectangular parallelepiped in the aggregate of the metal pieces is aligned substantially in a constant direction.

4. The polarization element according to claim 1, wherein the metal pieces have a substantially elliptical cylinder shape, and
the major axis of the ellipse is aligned substantially in a constant direction.

5. The polarization element according to claim 1, wherein the length of each of the metal pieces in a direction parallel to the propagation direction of the irradiated light is equal to or less than one-tenth of the wavelength of the irradiated light, and
the dimensions of each of the metal pieces in a plane perpendicular to the propagation direction of the irradiated light are equal to or less than 1 μm.

6. The polarization element according to claim 1, wherein each of the metal pieces is made of Al or an Al alloy including Al as a main component.

7. The polarization element according to claim 6, wherein the substrate is made of quartz glass.

8. The polarization element according to claim 1, wherein each of the metal pieces comprises at least one metal selected from the group consisting of Ti and Cr.

9. The polarization element according to claim 8, wherein the substrate is made of quartz glass.

10. The polarization element according to claim 1, wherein the substrate is made of quartz glass.

* * * * *